United States Patent [19]

Hasslauer et al.

[11] Patent Number: 4,672,869
[45] Date of Patent: Jun. 16, 1987

[54] GUIDING AND FEEDING DEVICE FOR A WORK BAR IN A LATHE

[75] Inventors: Heinz Hasslauer, Uhingen; Seweryn Gawronski, Esslingen, both of Fed. Rep. of Germany

[73] Assignee: Traub GmbH, Reichenbach/Fils, Fed. Rep. of Germany

[21] Appl. No.: 823,868

[22] PCT Filed: May 14, 1985

[86] PCT No.: PCT/EP85/00224
§ 371 Date: Jan. 2, 1986
§ 102(e) Date: Jan. 2, 1986

[87] PCT Pub. No.: WO85/05300
PCT Pub. Date: Dec. 5, 1985

[30] Foreign Application Priority Data
May 24, 1984 [DE] Fed. Rep. of Germany ....... 3419417

[51] Int. Cl.⁴ .................... B23B 13/02; B23B 13/12
[52] U.S. Cl. ......................... 82/2.5; 82/30; 279/4; 414/17
[58] Field of Search ........... 82/2.5, 30, 2.7; 279/4; 414/17, 18

[56] References Cited
U.S. PATENT DOCUMENTS
1,356,311 10/1920 Reilly et al.
2,639,494 5/1953 Belshaw .................... 29/59
3,933,061 1/1976 Link ......................... 82/30
4,130,289 12/1978 Zajac et al. ................ 279/1 A FOREIGN PATENT DOCUMENTS
3023248 1/1981 Fed. Rep. of Germany ........ 82/2.5
2276128 1/1976 France.
691087 5/1953 United Kingdom.

Primary Examiner—Nicholas P. Godici
Assistant Examiner—Jerry Kearns
Attorney, Agent, or Firm—Browdy and Neimark

[57] ABSTRACT

A hollow spindle (10) comprises a collet (20) at one end and behind the same and spaced from each other two guide sleeves (50,52) for the work bar (W). The rear guide sleeve (52) being the most remote from the collet (20) is axially displaceable in a direction toward the collet (20) against the resistance of a spring (58) and has an abutment face (82) remote from the collet (20) for a stock feeder (70). Upon advanced use of the work bar (W) the stock feeder (70) hits the abutment face (82) of the rear guide sleeve (52), pushing the same forwardly as the work bar (W) continues to be used up and advanced. By virtue of this arrangement the work bar (W) is guided in vibrationless manner and also the stock feeder (70) is kept largely without vibrating by its abutment against the rear guide sleeve (52).

7 Claims, 4 Drawing Figures

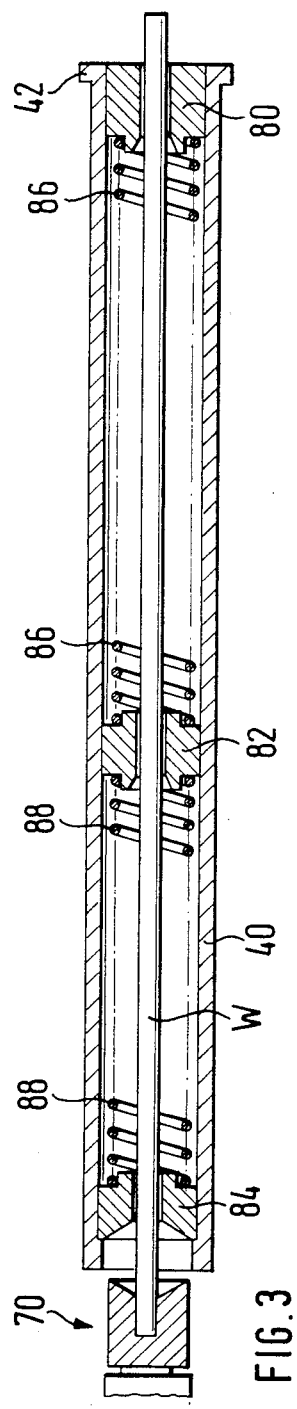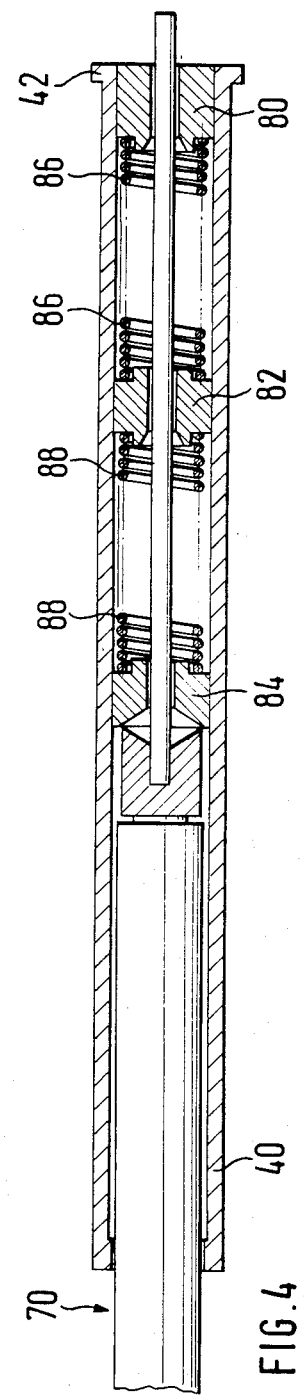

GUIDING AND FEEDING DEVICE FOR A WORK BAR IN A LATHE

The invention relates to a guiding and feeding device for a work bar in a lathe, comprising a hollow spindle which includes a chuck at one end and behind the same and spaced from each other at least two guide sleeves for the work bar, and a stock feeder for advancing the work bar in a direction toward the chuck.

With known guiding devices of this kind (journal "tz für Metallbearbeitung" no. 5/83 and no. 6/83) there are three guide sleeves stationarily arranged within the spindle, the first one directly behind the chuck and the other two at uniform spacings behind the same. The guide sleeves have an inner diameter closely adapted to the outer diameter of the work bar to be processed. A bar material magazine is arranged behind the spindle and comprises a plurality of roller sets between which the work bar is rotatably supported. A telescopic stock feeder is coordinated with the bar material magazine and disposed coaxially with the work bar behind the latter. It comprises an axially displaceable tubular outer feeder as well as a rod-like inner feeder guided for axial displacement in the outer feeder. The diameter of the inner feeder is smaller than the diameter of the work bar.

When a new work bar is introduced from behind into the spindle and its guide sleeves as well as the chuck, with this known arrangement, the rear end of the work bar is supported and held centered at the front end of the outer feeder. During operation of the lathe the work bar is fed step by step by the stock feeder, the outer and inner feeders moving in common until the front end of the outer feeder has reached a position at a small distance behind the rearmost guide sleeve of the spindle. Further forward movement of the outer feeder is impossible since its outer diameter is larger than the inner diameter of the guide sleeves. The further advance of the work bar is taken care of by the inner feeder which now is being pushed forward with respect to the outer feeder, penetrating the guide sleeves one after the other and finally the chuck until the work bar has been used up and any possible remainder has been ejected by the inner feeder in forward direction through the chuck.

The guide sleeves are exchangeable so that in each case guide sleeves can be used whose inner diameter is closely adapted to the diameter of the work bar. Yet the stock feeder, particularly the inner feeder is used unchanged for work bars of different diameters because it would be too expensive to restructure the stock feeder for each change of stock diameter. For this reason normally the outer diameter of the inner feeder cannot be adapted closely to the inner diameter of the guide sleeves in the spindle. Consequently there is more or less great radial clearance for the inner feeder in the guide sleeves. The same applies in the event that the stock feeder is not of telescopic design but instead includes a single rod only of slender configuration to be slipped into the guide sleeves.

In both cases guide sleeves adapted to the diameter of the bar material cannot guide the stock feeder at the same small radial clearance as the work bar. Thus the front portion of the stock feeder which has entered the guide sleeves tends to become somewhat eccentric within the spindle and, as a result, it causes vibrations in operation. In certain rotational speed ranges to be passed by the spindle, these vibrations may become so strong that they impair the quality of the workpiece processing.

On the other hand, if one or more rear guide sleeves for the work bars are dispensed with so as to provide room for a sturdier stock feeder instead, this entails the risk that small diameter work bars will buckle inside the spindle.

It is the object of the invention to remove as far as possible the causes for such vibrations of the stock feeder and the risk of buckling of the work bar within the spindle of a guiding device of the kind specified initially.

This object is met, in accordance with the invention, in that the rear guide sleeve most remote from the chuck has an abutment face remote from the chuck for the stock feeder, and that at least this rear guide sleeve is axially displaceable in a direction toward the chuck by means of the stock feeder together with the work bar against the resistance of at least one spring.

In this manner the stock feeder will hit against the abutment face of the rear guide sleeve as the work bar is used up progressively, pushing the guide sleeve forwardly as the work bar is used up further and advanced. Thus the spacing between the rear guide sleeve and the chuck is gradually reduced and for this reason the guidance of the rear portion of the work bar becomes ever better and vibrationless. Also the stock feeder is held largely without vibrating by its abutment at the rear guide sleeve. Consequently the tendency to vibrate is much reduced as regards the work bar and the stock feeder when comparing them with known guiding devices of the kind described initially. The above is true regardless of whether the stock feeder is of telescopic design or has but a single axially displaceable rod.

In the case of a preferred embodiment of the invention the or each displaceable guide sleeve is guided in an intermediate tube.

This embodiment is especially well suited for a lathe in which a gripping piston is arranged in a cylinder behind the spindle for actuating the collet. In this event the invention conveniently is developed further in that the intermediate tube projects rearwardly out of the spindle and ends in the range of the gripping piston.

Furthermore, it is advantageous if the rear guide sleeve projects telescopically to the rear out of the intermediate tube when not loaded by the stock feeder.

Finally, it is advantageous if the intermediate tube is exchangeable together with all guide sleeves and the associated at least one spring, as a uniform assembly.

Embodiments of the invention will be described further below with reference to diagrammatic drawings in which, in axial sectional elevation each:

FIG. 3 shows a modified guiding and feeding device in a first operational position; and FIG. 4 shows the device according to FIG. 3 in a second operational position.

Figure 1:
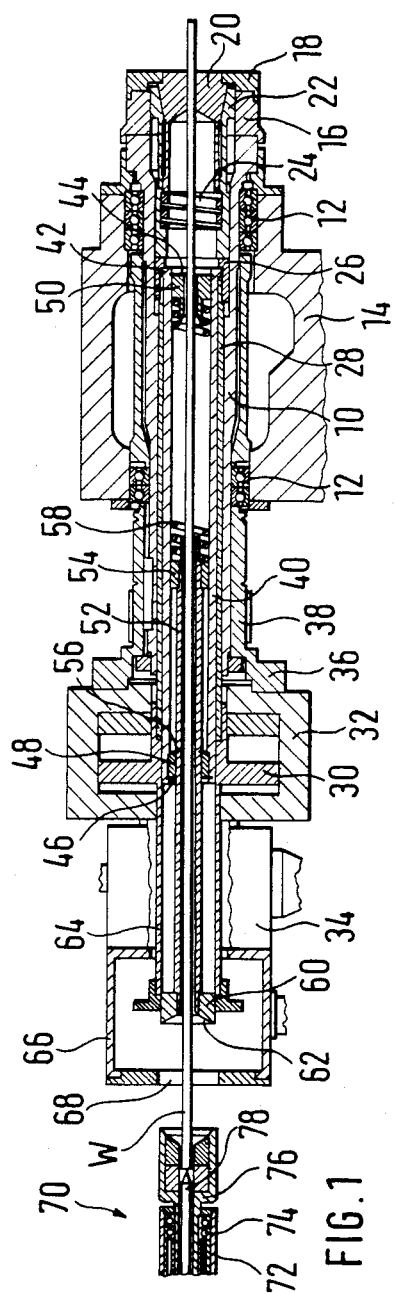
FIG. 1 shows parts of a lathe provided with a guiding and feeding device according to the invention, shown in a first operational position.

FIG. 1 shows a hollow spindle 10 which is part of an automatic lathe. It is journalled by a plurality of roller bearings 12 in a headstock 14 and not displaceable axially. The spindle 10 has a front end, at the right in FIG. 1, at which a front guard ring 18 is removably secured by way of an intermediate ring 16. A chuck is disposed inside the intermediate ring 16 and the front end of the spindle 10.

The chuck comprises a collet 20 supported toward the front on the guard ring 18. The collet 20 is formed with an outer conical surface which is enclosed a corresponding inner conical surface of a gripping sleeve 22. The gripping sleeve 22 is guided for axial displacement, at its front end in the intermediate ring 16 and its rear end directly in the spindle 10, and it is loaded by a compression spring 24 acting in the sense of displacement to the rear and being clamped between a rear end face of the collet 20 and a corresponding internal shoulder formed in the gripping sleeve 22.

A work bar W extends through the spindle 10, the gripping sleeve 22, and the collet 20, its front end portion protruding forwardly out of the collet 20 so as to be worked on. During this work the bar material must be clamped as firmly as possible in the collet 20. To this end the gripping sleeve 22 must be loaded by an axially forwardly directed force converted into forces which act radially on the work bar W by the conical surfaces of the gripping sleeve 22 and collet 20.

An annular cap 26 engages the rear end of the gripping sleeve 22 and is in threaded engagement with the front end of a gripping tube 28 so as to transmit the axial gripping force. The gripping tube 28 is guided for axial displacement inside the spindle 10 and in threaded engagement with a gripping piston 30 which operates in an hydraulic cylinder 32. At the rear the cylinder 32 is journalled in a stationary bearing box 34, and at the front it is in screw threaded engagement with a flange 36 of a toothed sleeve 38. The toothed sleeve 38 encloses the spindle 10 and is fixed for rotation with the same, a toothed belt (not shown) being wrapped around the sleeve to drive the same.

An intermediate tube 40 is disposed within the gripping tube 28 so as to project partly out of the same to the rear, and at its front end it has a collar 42 which is fastened to the gripping tube 28 by the annular cap 26. Locking rings 44 and 46, respectively, are inserted into the front and rear ends of the intermediate tube 40, the rear locking ring 46 delimiting a recess formed in the rear end portion of the intermediate tube 40 and retaining a slip ring 48 which is received in this recess. A guide sleeve 50 housed within the intermediate tube 40 is supported on the front locking ring 44.

A rear guide sleeve 52 is likewise received movably in the intermediate tube 40. The rear guide sleeve 52 is shaped like an elongated pipe and carries a slip ring 54 near its front end and a retaining ring 56 in its central portion. A spring 58 is mounted between the two guide sleeves 50 and 52 and, as shown in FIG. 1, tends to urge the rear guide sleeve 52 to far to the rear that the retaining ring 56 thereof rests against the slip ring 48.

A stop ring 60 is fastened to the rear end of the rear guide sleeve 52 and formed at its backside with an abutment or centering face 62 of hollow conical configuration. The stop ring is guided in a tubular projection 64 of the gripping piston 30. A stationary oil collector 66 is arranged all around the stop ring 60 and formed with a central aperture 68.

Figure 2:
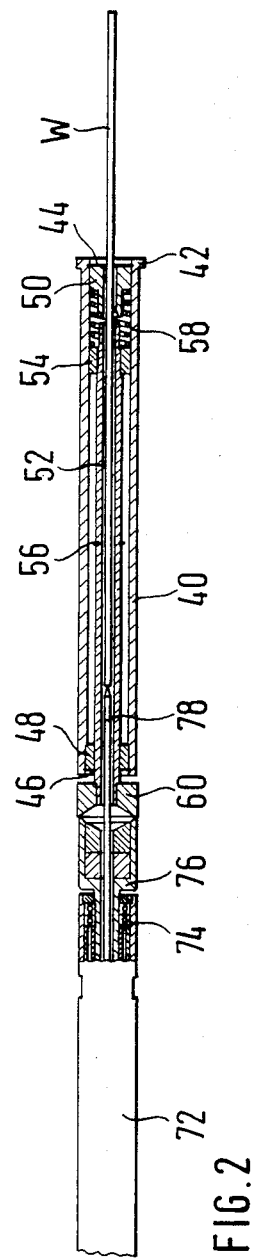
FIG. 2 shows the guiding and feeding device in a second operational position.

Behind the oil collector 66 a stock feeder 70 is arranged coaxially with the spindle 10, FIGS. 1 and 2 showing only the front end portion thereof. The stock feeder 70 comprises a tubular feeder casing 72 which is axially movable but secured against rotation. An outer feeder 76 likewise substantially tubular is journalled in the feeder casing 72 by roller bearings 74. A rod-like inner feeder 78 is guided for displacement in the outer feeder 76.

FIG. 1 shows the stock feeder 70 in a far advanced position which it adopts when the work bar W, originally several meters long, has been used up in great part. In this position a conventional bar material magazine (not shown) which comprises guide sleeves or roller sets, for example, can no longer guide and center the work bar W. For this reason a risk of buckling of the work bar W would exist unless it were guided at a rather small distance from the front end of the stock feeder 70 by the guide sleeve 50 which extends far to the rear. As the processing of the workpiece continues which takes place in front of the collet 20 and the stock feeder 70 advances the work bar W accordingly, the front end of the outer feeder 76 will pass through the aperture 68 into the oil collector 66 and hit against the abutment face 62 which has a certain centering effect on the feeder.

Upon further forward movement the stock feeder 70, acting against the resistance of the spring 58, pushes the rear guide sleeve 52 in forward direction until the latter reaches its terminal position shown in FIG. 2. The further advancing movement of the work bar W in accordance with the further workpiece processing is taken care of by the inner feeder 78 as it exits progressively from the outer feeder 76, as shown in FIG. 2. At this time the work bar W is continued to be to be guided almost uninterruptedly in the guide sleeves 50 and 52.

If work is to be done on bar material of a different diameter, the guard ring 18 is screwed off and the collet 20 together with the gripping sleeve 22 and compression spring 24 are withdrawn from the front end. The annular cap 26 which then is accessible may be loosened from the gripping tube 28 by means of a screw driver. Subsequently the intermediate tube 40 together with its two guide sleeves 50 and 52 and the spring 58 may be pulled out as an integral assembly from the front end of the gripping tube 28 or pushed out from the rear. It may then be replaced by a corresponding assembly including an identical intermediate tube 40 but guide sleeves which are adapted to the new stock diameter.

With the embodiment shown in FIGS. 3 and 4 substantially only parts disposed inside the intermediate tube 40 differ from those illustrated in FIGS. 1 and 2. As may be taken from FIGS. 3 and 4, the intermediate tube 40 contains a front guide sleeve 80 corresponding in arrangement and essentially also in configuration to guide sleeve 50, and a central guide sleeve 82, as well as a rear guide sleeve 84, the latter two together replacing the guide sleeve 52 and its stop ring 60 according to FIGS. 1 and 2.

The abutment face 62 for the stock feeder 70 is formed at the rear guide sleeve 84 which does not protrude out of the intermediate tube 40 in its final rear position, contrary to the guide sleeve 52. The central guide sleeve 82 rests on the front guide sleeve 80 through intermission of a spring 86, while the rear guide sleeve 84 is supported on the central guide sleeve 82 by way of a spring 88. The two springs 86 and 88 are compression springs having the same spring characteristic and mounted under axial bias.

According to FIGS. 3 and 4 the stock feeder 70 is not divided into outer and inner feeders and has a maximum outer diameter which is smaller than the minimum inner diameter of the intermediate tube 40.

When the work bar W becomes shorter than shown in FIG. 3 because its front end is being turned off, the stock feeder 70 enters into the intermediate tube 40 and hits against the abutment face 62. From then on the stock feeder 70 pushes the rear guide sleeve 84 ahead of itself, the two springs 86 and 88 which are mutually balanced being compressed uniformly so that the central guide sleeve 82 will move on in a manner as to always maintain a central position between the other two guide sleeves 80 and 84. At this time the work bar W is being guided by all three guide sleeves 80, 82, and 84 until the springs 86 and 88 will have become totally compressed. What remains at that point of the work bar W can be worked only under the condition that the simple stock feeder 70 as shown in FIGS. 3 and 4 is replaced by a stock feeder divided into an inner feeder and an outer feeder in accordance with FIGS. 1 and 2.

What is claimed is:

1. A guiding and feeding device for a work bar (W) in a lathe, comprising:
    a hollow work spindle (10) having a front end and a rear end,
    a chuck (20) attached to the front end of the work spindle (10),
    an actuating tube (28) guided for axial displacement within the work spindle (10),
    an actuating piston (30) arranged in a cylinder (32) behind the rear end of the work spindle (10), the actuating tube (28) interconnecting the acuating piston (30) and the chuck (20) so as to transform an axial force generated by the actuating piston (30) into a clamping force exerted by the chuck (20) onto the work bar (W),
    an intermediate tube (40) disposed within the actuating tube (28) and having a front end near the chuck (20) and a rear end near the actuating piston (30), a front guide sleeve (50 or 80) arranged stationarily within the intermediate tube (40) at the front end thereof and adapted for guiding the work bar (W),
    a rear guide sleeve (52 or 84) axially spaced from the front guide sleeve (50 or 80), said rear guide sleeve (52 or 84) being adapted to guide the work bar (W) and having a rear abutment face (62), the rear guide sleeve (52 or 84) being guided for axial displacement within the intermediate tube (28) and, in a position of rest, cooperating with an abutment at the rear end of the intermediate tube (28),
    at least one spring (58 or 88) tending to keep the rear guide sleeve (52 or 84) in its position of rest, and
    a stock feeder (70) aligned with the work spindle (10) and reciprocable in the axial direction thereof to advance the work bar (W), the stock feeder (70) being adapted to abut against the rear abutment face (62) of the rear guide sleeve (52 or 84) and urge the same towards the front guide sleeve (50 or 80).

2. The device of claim 1, wherein the rear guide sleeve (52), in its position of rest, projects telescopingly to the rear end out of the intermediate tube (40).

3. The device of claim 2, wherein the intermediate tube (40) together with all guide sleeves (50, 52; 80, 82, 84) and the associated at least one spring (58; 86, 88) are exchangeable as a constructional unit.

4. The device of claim 1, wherein a central guide sleeve (82) is arranged between, and axially spaced from, the front and rear guide sleeves (80 and 84, respectively), springs (86, 88) being interposed between the central guide sleeve (82) and each of the front and rear guide sleeves (80, 84).

5. The device of claim 4, wherein the intermediate tube (40) together with all guide sleeves (50, 52; 80, 82, 84) and the associated at least one spring (58; 86, 88) are exchangeable as a constructional unit.

6. The device of claim 1, wherein the intermediate tube (40) together with all guide sleeves (50, 52; 80, 82, 84) and the associated at least one spring (58; 86, 88) are exchangeable as a constructional unit.

7. The device of claim 6, wherein the intermediate tube (40) together with all guide sleeves (50, 52; 80, 82, 84) and the associated at least one spring (58; 86, 88) are exchangeable as a constructional unit.

* * * * *